United States Patent [19]

Vogel

[11] 4,274,125
[45] Jun. 16, 1981

[54] TEMPERATURE COMPENSATED CAPACITANCE PRESSURE TRANSDUCER

[75] Inventor: Ronald F. Vogel, DeKalb, Ill.

[73] Assignee: The Bendix Corporation, Southfield, Mich.

[21] Appl. No.: 6,301

[22] Filed: Jan. 23, 1979

[51] Int. Cl.³ .............................................. H01G 7/00
[52] U.S. Cl. .................................... 361/283; 73/718; 73/724
[58] Field of Search .................... 361/283, 271, 290; 73/718, 724

[56] References Cited

U.S. PATENT DOCUMENTS

| 3,230,431 | 1/1966 | Deniston | 361/290 |
| 3,402,448 | 9/1968 | Hoath | 361/271 X |
| 3,634,727 | 1/1972 | Polye | 361/283 X |
| 3,748,571 | 7/1973 | Kurtz | 361/283 X |
| 3,943,915 | 3/1976 | Severson | 73/724 |

Primary Examiner—Elliot A. Goldberg
Attorney, Agent, or Firm—W. G. Christoforo; B. L. Lamb

[57] ABSTRACT

A pressure transducer is comprised of a crystalline quartz deflection plate which is clamped to a clamping plate having a rectangular hole therein so that deflection of the crystalline quartz plate in response to pressure difference thereacross is into the rectangular hole. The crystallographic axes of the deflection plate are arranged with respect to the longitudinal axis of the rectangular hole so that the deflection versus temperature curve of the transducer is a quadratic.

12 Claims, 9 Drawing Figures

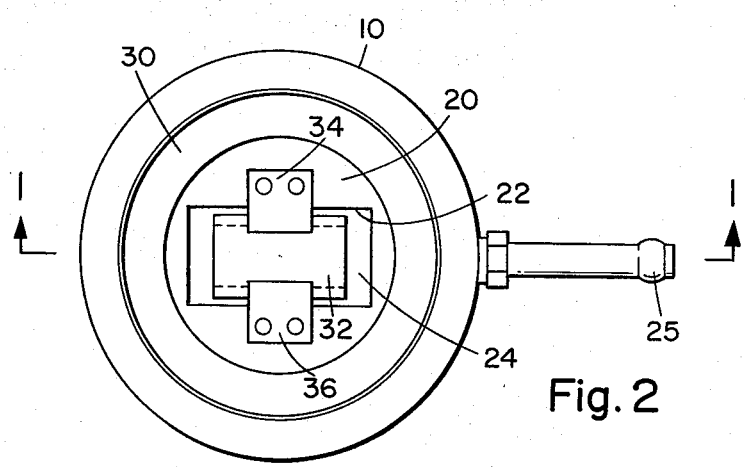
Fig. 2
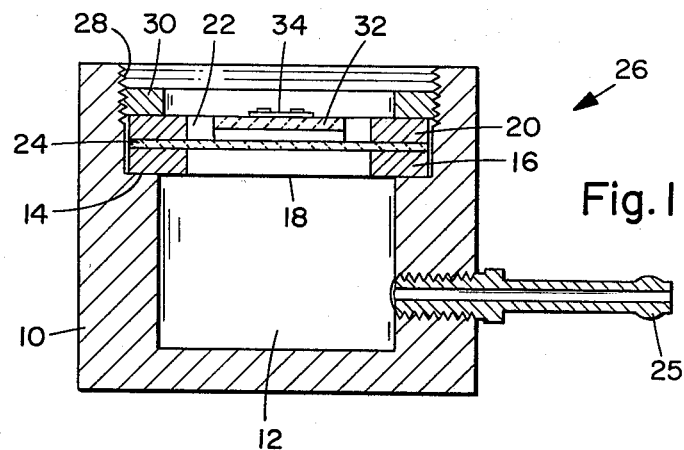
Fig. 1
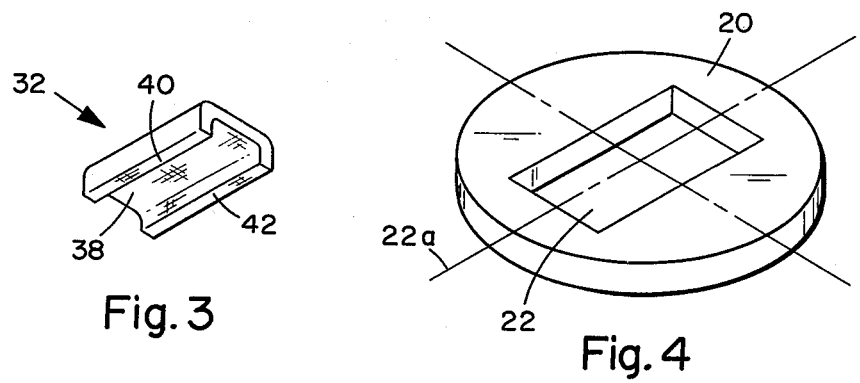
Fig. 3
Fig. 4

TEMPERATURE COMPENSATED CAPACITANCE PRESSURE TRANSDUCER

FIELD OF THE INVENTION

This invention relates to capacitive pressure transducers wherein the capacitance of the pressure transducer varies with respect to pressure across the transducer. More particularly, the invention relates to such transducers wherein at least one of the capacitor plates is a deflecting crystalline quartz plate. Even more particularly, the invention relates to a temperature compensation scheme for such pressure transducers.

BACKGROUND OF THE INVENTION

Crystalline materials have the highest mechanical Q's of all known materials. Their elastic properties are very stable and repeatable. Crystalline materials are thus normally used for deformation type applications wherein stability and repeatability are desired. One of the best crystalline materials insofar as stability and repeatability are concerned and most inexpensive as to cost is alpha quartz. This material has been used as a vibrating element for frequency control because of its stability and repeatability since at least the 1930's.

Most methods of measuring pressures involve the deformation of some type of material. Two general criteria are applied to such pressure measuring devices: the quality of the deforming material, and the inherent accuracy limits of the means and method by which the pressure measurement is made. In addition, the practicality of a pressure measuring means is also of primary importance. Capacitance pressure measuring devices offer a simple structure and convenient method of pressure measurement and thus comprise practical pressure measuring means. Capacitance pressure measuring devices normally consist of two parallel plates which comprise the plates of a capacitor, at least one of which plates deflects in response to pressure difference thereacross to vary the capacitance so that capacitance is related to pressure difference. Capacitance pressure measuring devices having a crystalline quartz deflecting plate are potentially very accurate because the quality of crystalline deforming material in the capacitance pressure measuring means will be excellent.

SUMMARY OF THE INVENTION

Given the stability and the repeatability of deformation of quartz crystals used as the deformable material in a capacitance pressure sensing means, the parameter remaining to be optimized is the change in deformation of the quartz material, for a given pressure difference thereacross, with respect to temperature. In other words, for many applications involving use of a capacitance pressure sensing means having a crystalline quartz deforming member for use over a given temperature range, the device must be temperature compensated to provide the desired accuracy. In the present invention temperature compensation of a capacitance pressure sensing means is effected by consideration of the crystalline quartz temperature coefficients of the elastic constants.

It is known that two of the temperature coefficients of the elastic constants of crystalline quartz are positive while the rest of the temperature coefficients are negative. This fact is used in the present invention to provide a capacitance pressure sensing means which has a zero first order temperature coefficient.

According to the present invention a capacitance pressure sensing means is comprised of a pressure deformable crystalline quartz plate having at least one surface metallized to provide one capacitor plate. A second plate comprises the second capacitor plate. The first plate is clamped to a third plate having a rectangular hole so that the deformation of the first plate is through the rectangular hole. The plates are arranged so that the capacitance varies with pressure. The crystallographic axes of the deforming or deflecting plate and the longitudinal axis of the rectangular hole are arranged so that the deflection versus temperature curve of the capacitor is a quadratic. The resulting capacitance pressure measuring means will thus have a zero first order temperature coefficient.

A means for aligning the axes of the various plates is also described below.

In a second embodiment shown below the functions of the above mentioned second and third plates are combined in a single plate which cooperates with the deflecting plate to comprise the capacitance pressure measuring means.

It is an object of this invention to provide a capacitance pressure measuring means or transducer having a zero first order temperature coefficient.

Another object of the invention is to provide a capacitance pressure measuring transducer having a crystalline quartz pressure deformable member which is temperature compensated.

These and other objects of the invention will become clear with a reading and understanding of the following description of my invention wherein:

FIG. 1 is a sectional view of a capacitance pressure transducer built according to the principles of this invention.

FIG. 2 is a plan view of the transducer of FIG. 1.

FIG. 3 is a view of the nondeflecting capacitor plate of FIG. 1.

FIG. 4 shows a typical clamping plate of FIG. 1 in greater detail.

DESCRIPTION OF THE PREFERRED EMBODIMENT

Figure 5:
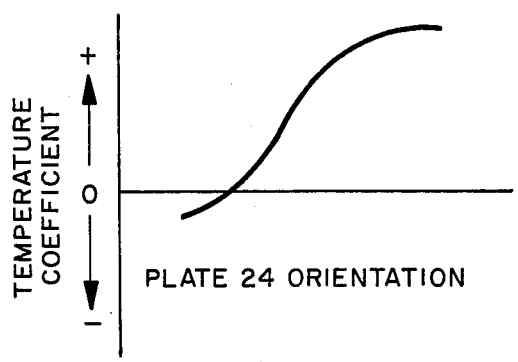
FIG. 5 is a graph of the first order temperature coefficient for various orientations of the crystalline axes of the deflecting plate of FIG. 1.

Referring to FIG. 1 a pressure transducer includes a cylindrical body member 10 which has a central dead-end bore 12 having a shoulder 14. A clamping plate 16 which has a centrally located rectangular hole 18 rests on shoulder 14. An essentially identical clamping plate 20 having a rectangular hole 22 is used to sandwich rigidly between itself and clamping plate 16 a crystalline quartz deflecting plate 24 which is metallized on one surface thereof to form one plate of a capacitor. Rectangular hole 18 is arranged to be registered with rectangular hole 22. The upper portion 26 of bore 12 is threaded

(28) to receive a threaded clamping ring 30 which is run down into the bore to rigidly clamp quartz plate 24 to and between clamping plates 16 and 20.

A second capacitor plate is comprised of a fused (amorphous) quartz plate 32 held against quartz plate 24 by flat springs 34 and 36 (FIG. 2). Plate 32 is seen in greater detail at FIG. 3, reference to which figure should now be made. It is seen that plate 32 is generally rectangular with a longitudinal channel 38 cut therein and the bottom surface of the channel metallized to form the second capacitative plate. Plate 32 is arranged in FIG. 1 so that rails 40 and 42 are in contact with plate 24.

Referring now to FIG. 2 there is seen in plan view the device of FIG. 1 including the cylindrical body member 10 and a clamping ring 30. In addition there is seen within rectangular hole 22 of clamping plate 20 quartz plate 32 resting against plate 24 and held in place by flat springs 34 and 36. The long sides of plate 32 are preferably in close proximity to the long sides of rectangular hole 22, that is, so that rails 40 and 42 (FIG. 3) are supported and in contact with deflecting plate 24 at a portion of said deflecting plate that deflects insignificantly in response to pressure. A port 25, seen here and in FIG. 1 allows communication into the chamber comprised of bore 12 and plate 24. It should be understood with respect to FIG. 2 that the elements thereof are assembled so that the forementioned chamber is sealed, except for port 25, with respect to the fluid therein. It should also be understood that suitable electrical connections are made to the various capacitor plates in a manner known to those skilled in the art but which do not comprise a portion of the present invention and are not shown in the figures.

Clamping plates 16 and 20 are generally identical to one another. Plate 20 is shown in FIG. 4., reference to which figure should now be made. Plate 20 is preferably a circular disc-like plate with a rectangular hole 22 having a longitudinal axis 22a which coincides with the diameter of plate 20.

In operation, as should be clear, a positive pressure in chamber 12 with respect to ambient pressure causes quartz plate 24 to deflect towards second plate 32 thereby to increase the capacitance between the two plates. A negative pressure in chamber 12 causes quartz plate 24 to deflect away from second plate 32 to thereby decrease the capacitance.

Figure 6:
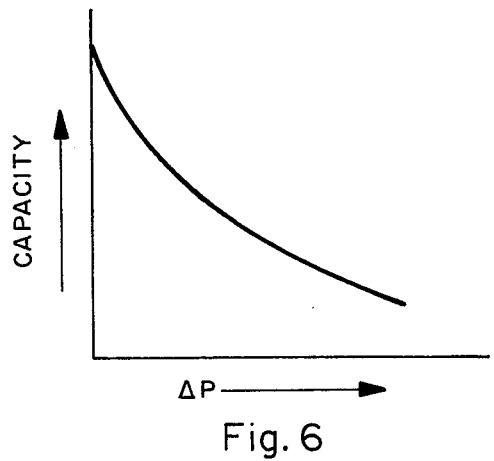
FIG. 6 is a graph of pressure versus capacitance for the transducer of FIG. 1.

In one transducer similar to that shown in FIGS. 1, 2 and 3 where the clamping plates 16 and 20 were made of stainless steel, a crystalline quartz deflecting plate identical to plate 24 and having its y and z axes in the plane of the plate and its x axis perpendicular to the plane of the plate was assigned an arbitrary zero axis in the plane of the plate and assembled to form the transducer. The angle between the arbitrary zero axis and the crystallographic axes was unknown. The pressure across plate 24 was varied at various temperatures to produce a family of curves, a representative curve of the family being seen as FIG. 6 and which shows capacity opposed to differential pressure. The difference between the various curves for a given orientation of plate 24 is a measure of the temperature coefficient for the transducer with the particular orientation of plate 24. Plate 24 was then rotated through a predetermined angle and the above described measurements repeated to obtain the transducer first order temperature coefficient for the new orientation. This was repeated for additional plate 24 orientations and the resulting first order temperature coefficients plotted against plate 24 orientation to obtain the curve of FIG. 5. It can be seen that at one orientation of plate 24 the first order temperature coefficient is zero.

It should now be obvious that a clamped crystalline quartz deformation plate deflecting through a rectangular hole is an arrangement which can provide a capacitance type pressure transducer with a zero first order temperature coefficient. The variables are the angle between the crystallographic axes of the deflecting plate and the center line of the hole, and the thermal expansion coefficient of the clamping plate material. In the preferred embodiment shown below the rectangular hole is cut in a plate of crystalline quartz and the deflecting plate clamped thereto.

Figure 7:
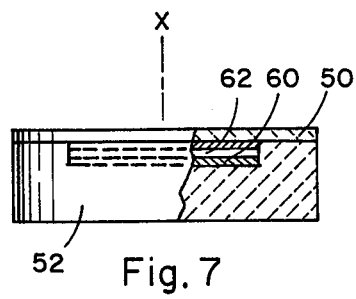
FIG. 7 is a cross-sectional view of another form of capacitance pressure transducer built in accordance with the principles of this invention.
Figure 8:
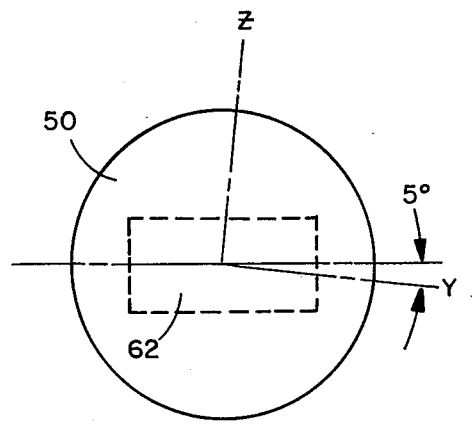
FIG. 8 is a plan view of the transducer of FIG. 7.

It is preferred that the y and z axes of both the deflecting plate and the crystalline quartz clamping plate to be described below lie in the plane of the various plates and the x axis be perpendicular to the plane of the various plates. It is also preferred that the rectangular hole be cut in the clamping plate parallel to its y crystallographic axis and that the deflecting plate be aligned with its y axis about 5° from the longitudinal center line of the hole as shown in FIGS. 7 and 8. These figures show a pressure transducer built in accordance with the principles of this invention having a deflection plate 50 rigidly bonded to clamping plate 52. Preferably this rigid bonding is accomplished through the use of solder glass at the entire interface of deflection plate 50 with clamping plate 52, that is, at the entire contact area of the plates. A second method of rigidly bonding the two plates is to copper or nickle metallize the contacting surfaces and accomplish the bond by use of a metal-to-metal diffusion bond or solder.

Clamping plate 52 includes a rectangular hole or slot 62 the bottom of which is metallized to comprise one plate 60 of the capacitor. Deflecting plate 50 is metallized to comprise another capacitor plate 58. It should be obvious if the rigid bond between plates 50 and 52 is accomplished by metal-to-metal techniques that a metallized surface on deflecting plate 50 can be applied over the entire applicable surface of the deflecting plate to provide both the metallized surface required for bonding and also the deflecting plate capacitor plate. Electrical contact to the various capacitor plates is provided by conventional means and, for clarity in describing the present invention, need not be shown here. It can be seen that y and z axes of deflecting plate 50 lie in the plane of the plate and axis x is perpendicular to the plane of the plate. In addition, the y axis of deflecting plate 50 is offset from the longitudinal axis of hole 62 by 5°. With respect to the device of FIGS. 7 and 8 it should be understood that the deflection of plate 50 is properly into a rectangular hole so that the device shown is suitable for applications where the pressure on the top of plate 50, in the orientation of FIG. 7, is greater than the pressure under plate 50.

With respect to the device of FIGS. 7 and 8 if plate 50 is not rigidly bonded or clamped to clamping plate 52, the thermoelastic constant of the transducer is about −80 ppm/°C. Clamping plate 50 to plate 52 decreases the effective thermoelastic constant. As the y crystallographic axis of plate 50 is moved off the longitudinal axis of the rectangular hole the appropriate thermoelastic constants become positive. At the ideal angle, that is when the transducer thermoelastic constant is zero, the deflection versus temperature curve of the transducer is a quadratic. In the device of FIGS. 7 and 8 this was found to be at the 5° degrees offset shown.

Figure 9:
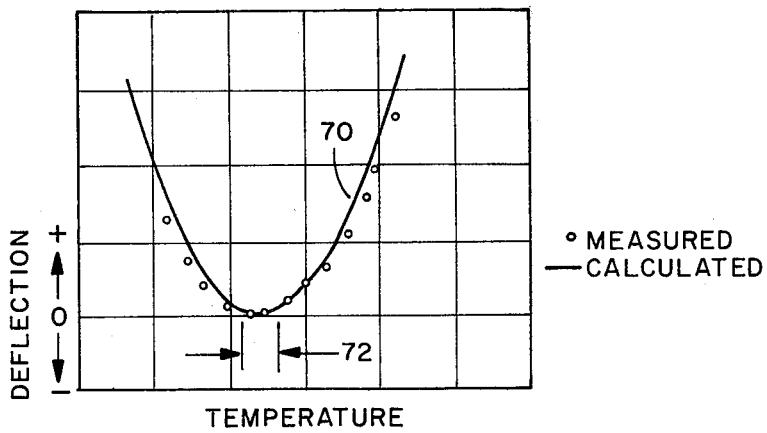
FIG. 9 is a graph of deflection versus temperature for a typical transducer made in accordance with the principles of this invention.

A graph of deflection versus temperature for a typical transducer made in accordance with the principles of the present invention is shown at FIG. 9, reference to which should now be made. One skilled in the art will recognize curve 70 to be similar to the frequency versus temperature curves found in the literature of the quartz crystallographic arts. In the present case curve 70 is the theoretical curve for a typical inventive device. It can be seen it follows very closely the data obtained by plotting deflection versus temperature for a fixed pressure difference across the deflection plate when the crystallographic axes are aligned with the rectangular hole as taught by the present invention. This quadratic curve exhibits a generally flat portion 72 where the first order temperature coefficient is substantially zero.

A pressure transducer built according to the principles of this invention and to the embodiment of FIGS. 7 and 8 and suitable for a pressure range of 0–7 psi has a 2 inch outside diameter. The rectangular hole measures 1⅜ inches by ½ inch and is 0.001 inches deep. The crystalline alpha quartz deflection plate is 0.010 inches thick and is rigidly bonded to the clamping plate through the use of solder glass.

Having described my invention and various embodiments thereof certain alterations and modifications thereof should now suggest themselves to one skilled in the art. Accordingly, the invention is to be limited only by the true spirit and scope of the appended claims.

The invention claimed is:

1. A pressure transducer comprising:
a crystalline deflection plate;
a clamping plate having a rectangular recess therein, said deflection plate and clamping plate being held together at least at the periphery thereof so that said deflection plate deflects into said recess in response to pressure difference thereacross, the crystallographic axes of said deflection plate being arranged with respect to the longitudinal axis of said recess to produce a quadradic transducer deflection versus temperature curve.

2. The pressure transducer of claim 1 wherein the amount of deflection of said deflection plate is a measure of the pressure difference thereacross.

3. The pressure transducer of claims 1 or 2 wherein said deflection plate has at least one face thereof metallized to comprise the first plate of a capacitor and including a second plate of said capacitor.

4. The pressure transducer of claims 1 or 2 wherein said deflection plate comprises the first plate of a capacitor and including a second plate of said capacitor.

5. The pressure transducer of claim 1 wherein said clamping plate comprises a crystalline clamping plate.

6. The pressure transducer of claims 1 or 5 wherein said deflection plate is crystalline quartz.

7. The pressure transducer of claim 6 wherein said clamping plate is crystalline quartz.

8. The pressure transducer of claim 6 wherein the y crystallographic axis of said deflection plate is arranged at about a 5° angle with respect to the longitudinal axis of said recess.

9. The pressure transducer of claim 8 wherein at least one face of said deflection plate and the bottom of said recess are metallized to comprise the plates of a capacitor.

10. The pressure transducer of claim 1 wherein said deflection plate and clamping plate are held together by rigidly bonding said deflection plate to said clamping plate through the use of solder glass at the interface thereof.

11. The pressure transducer of claim 1 wherein the surfaces of said deflection plate and clamping plate at the interface thereof are metallized, and wherein said deflection plate and clamping plate are held together by soldering at said interface.

12. The pressure transducer of claim 1 wherein the surfaces of said deflection plate and clamping plate at the interface thereof are metallized and wherein said deflection plate and clamping plate are held together by a metal-to-metal diffusion bond at said interface.

* * * * *